S. FARQUHAR.

Metallic Fastening for Roofing Slates.

No. 9,710. Reissued May 17, 1881.

Attest:
J. H. Schott
A. Moore

Inventor:
Samuel Farquhar,
pr Norman W. Stearns,
Attorney.

N. PETERS, Photo-Lithographer, Washington, D. C.

UNITED STATES PATENT OFFICE.

SAMUEL FARQUHAR, OF BOSTON, MASSACHUSETTS.

METALLIC FASTENING FOR ROOFING-SLATES.

SPECIFICATION forming part of Reissued Letters Patent No. 9,710, dated May 17, 1881.

Original No. 138,999, dated May 20, 1873. Application for reissue filed March 22, 1881.

*To all whom it may concern:*

Be it known that I, SAMUEL FARQUHAR, of Boston, in the county of Suffolk and State of Massachusetts, have invented an Improved Method of Attaching Slates to Roofs, of which the following is a full, clear, and exact description, reference being had to the accompanying drawings, making part of this specification, in which—

Figure 1:
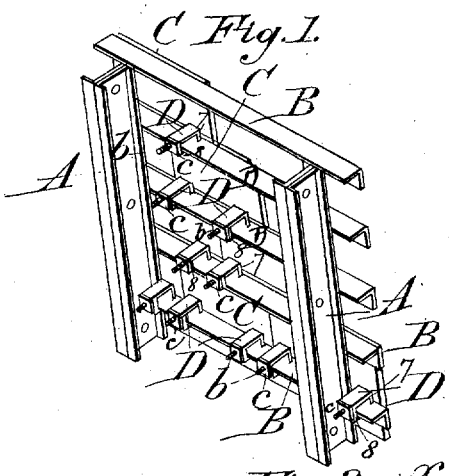
Figure 3:
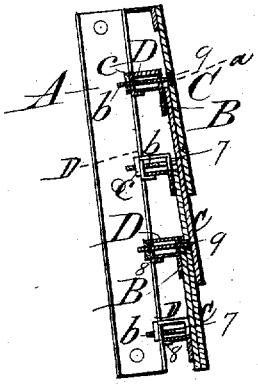
Figure 2:
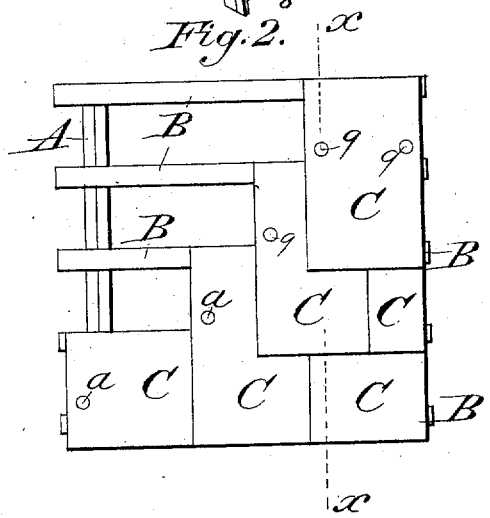
Figure 4:
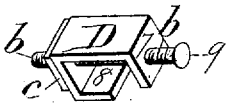

Figure 1 is a perspective view of the inner or under side of a portion of the roof of a building. Fig. 2 is a plan of the outside of the same. Fig. 3 is a vertical section on the line *x x* of Fig. 2. Fig. 4 is a view representing one description of my fastening device detached.

My present invention relates particularly to the manner of securing slates to iron roofs. This has heretofore been accomplished by nails of lead, copper, or other soft metal, or by copper wire passing through the slates and being clinched, bent, or turned around the purlins on which they rest. The employment of leaden or copper nails is objectionable, for the reason that when turned under or around the edges of the purlin they are cut thereby, and when much snow is on the roof the pressure thereof tends to stretch, draw out, and straighten these nails, whereby the slates are loosened from their proper position; and where the copper wire is used the heads of the slates cannot be supported by the purlins, owing to the necessity of passing the wire around them, and the heads of the slates are consequently liable to be tipped down by the action of the wind, thus allowing the rain to pass under their tails or lower ends, causing the roof to leak.

My present invention has for its purpose to remedy these objections; and it consists in a metallic fastening so constructed as to combine three essential features, viz.: first, a hook to enable it to catch under or around the purlin on which the slate rests; second, a connection interposed between the slate and the hook; and, third, a support or bearing for said connection, the support resting on the purlin and preventing the slate from sagging or slipping down.

To enable others skilled in the art to understand and use my invention, I will proceed to describe some of the devices I employ in carrying out the same.

In the said drawings, A A represent the iron rafters of a roof, to which are secured the angle-iron or L-shaped purlins B B, upon which are laid the slates C C—a connection which in this form of my invention is an iron bolt, *b*, passing through a hole, *a*, in the slate, and then through two perforations in the outer and inner portions, 7 8, of a bent plate, D, adapted to the shape of the purlin—firmly securing the slate to the hook catching under or around the purlin, such hook in the present case being formed by turning up the inner extremity of said plate and catching under the inner edge of the purlin. The present illustration of my invention shows the support for said connection as formed by the end of the outer portion, 7, of the bent plate resting on the upper outer surface of the purlin, by which means the slate is prevented from sagging or slipping down. The outer end of the bolt *b* is provided with a head, 9, which is countersunk flush with or below the outer surface of the slate, the inner end of the bolt having a screw-thread, over which turns a nut, *c*, by which the slate is brought to its bearing on the purlin.

Where purlins of other forms in cross-section than L or T shape are employed, the bent plate will be made to conform thereto, the change in the bend being readily suggested by that of the purlin.

Where the construction of the building is such as to render it difficult or impossible to use screw-nuts, the inner portion of each bolt *b* is intended to screw directly into the inner portion of the plate, a groove being formed in the head of the bolt to allow of its being turned with a screw-driver.

Instead of using a screw-bolt in connection with my bent plate, a leaden, copper, or iron bolt or nail without a screw-thread may be employed, one end of the bolt or nail being clinched, riveted, or turned down over the bent plate; but I prefer the screw-bolt as first described.

The form of the support for the bolt may be other than that shown, but I prefer to use the bent plate D, because the hook and the support for the bolt are formed integral therewith, and the plate is therefore more reliable and convenient to apply.

By means of the fastening devices above described I am enabled to so secure the slates that their heads will rest on the purlins without the liability of becoming loose, which is not the case where they are secured by lead or copper nails, as heretofore. Furthermore, the strength of my fastenings admits of a larger and heavier slate being employed than has before been practicable, and consequently the purlins can be placed farther apart, and their number thus reduced, as well as the labor of slating the roof, the result of which is a material saving in the cost of construction.

I claim—

1. A metallic fastening for securing slates to roofs, consisting of a hook to engage with the purlin, a connection for securing the slate to the hook, and a support or bearing for said connection, the said three features being combined and arranged to operate substantially as and for the purpose described.

2. A metallic plate, D, in combination with a screw bolt or nail, the said plate having a hook to engage with the purlin, and a support for the bolt or nail, formed integral with said hook, substantially as and for the purpose set forth.

Witness my hand this 17th day of March, 1881.

SAMUEL FARQUHAR.

In presence of—
JOHN MACK,
GEO. B. CHADBOURN.